US009547370B2

(12) United States Patent
Chiu et al.

(10) Patent No.: US 9,547,370 B2
(45) Date of Patent: Jan. 17, 2017

(54) SYSTEMS AND METHODS FOR ENABLING FINE-GRAINED USER INTERACTIONS FOR PROJECTOR-CAMERA OR DISPLAY-CAMERA SYSTEMS

(71) Applicant: FUJI XEROX CO., LTD., Tokyo (JP)

(72) Inventors: Patrick Chiu, Mountain View, CA (US); Hao Tang, Sunnyvale, CA (US); Qiong Liu, Cupertino, CA (US); Sven Kratz, San Jose, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 55 days.

(21) Appl. No.: 14/288,370

(22) Filed: May 27, 2014

(65) Prior Publication Data
US 2015/0346825 A1    Dec. 3, 2015

(51) Int. Cl.
G06F 3/01 (2006.01)
G06F 3/042 (2006.01)

(52) U.S. Cl.
CPC ............ G06F 3/017 (2013.01); G06F 3/0425 (2013.01)

(58) Field of Classification Search
CPC ...... G06F 3/017; G06F 3/0317; G06F 3/0425; G06T 7/0085; G06T 7/0087; G06T 19/00; G06T 19/003; G06T 19/006; G06T 19/20
See application file for complete search history.

(56) References Cited

U.S. PATENT DOCUMENTS

| | | | | |
|---|---|---|---|---|
| 8,086,026 B2 * | 12/2011 | Schulz | .................. | G06T 7/0042 382/154 |
| 9,110,512 B2 * | 8/2015 | Exner | ..................... | G06F 3/017 |
| 2006/0192782 A1 * | 8/2006 | Hildreth | .................. | A63F 13/00 345/473 |
| 2010/0091112 A1 * | 4/2010 | Veeser | ................ | G01B 11/002 348/207.1 |
| 2013/0120224 A1 * | 5/2013 | Cajigas | .................... | G09G 5/00 345/8 |

OTHER PUBLICATIONS

Seokhee Jeon, Jane Hwang, Gerald J. Kim, Mark Billinghurst, "Interaction with large ubiquitous displays using camera-based mobile phones", Pers Ubiquit Comput (2010), 14: 83-94, Published online: Aug. 1, 2009, Springer-Verlag London Limited 2009.*

(Continued)

Primary Examiner — Jonathan Boyd
Assistant Examiner — Sardis F Azongha
(74) Attorney, Agent, or Firm — TransPacific Law Group; Pavel I. Pogodin, Esq.

(57) ABSTRACT

A computer-implemented method performed in connection with a mobile computing device held by a user, the mobile computing device displaying a marker pattern, the method being performed in a computerized system incorporating a processing unit, a camera and a memory, the computer-implemented method involving: acquiring a plurality of images of the mobile computing device displaying the marker pattern using the camera; using the central processing unit to detect the marker pattern within the acquired plurality of images; using the central processing unit to determine a plurality of positions of the mobile computing device based on the detected marker pattern within the acquired plurality of images; and processing a user event based on the determined plurality of positions of the mobile computing device.

25 Claims, 14 Drawing Sheets

(56) References Cited

OTHER PUBLICATIONS

Agrawal, S., Constandache, I., Gaonkar, S., Roy Choudhury, R., Caves, K., and DeRuyter, F. Using mobile phones to write in air. Proc. of MobiSys '11, pp. 15-28.
Amma, C., Scultz, T. Airwriting: Demonstrating mobile text input by 3d-space handwriting recognition. Proc. IUI '12, pp. 319-320.
Bennett, S., Lasenby, J. ChESS—Quick and robust detection of chess-board features. Computer Vision and Image Understanding, 118: 197-210 (Jan. 2014).
Cunningham, A., Close, B., Thomas, B. Hutterer, P. TableMouse: a novel multiuser tabletop pointing device. Proceedings of OZCHI '09, pp. 169-176.
Flock of Birds Tracker. http://www.ascension-tech.com/realtime/RTflockofBIRDS.php, visited on May 27, 2014.
Inkscape Software. http://www.inkscape.org, visited on May 27, 2014.
Kinect for Xbox. http://www.xbox.com/en-US/kinect, visited on May 27, 2014.
Microsoft Fresh Paint Software. http://www.microsoft.com/en-us/freshpaint, visited on May 27, 2014.
Microsoft Paint Software. http://windows.microsoft.com/en-us/windows7/products/features/paint, visited on May 27, 2014.
Microsoft Surface Pro Tablet. http://www.microsoft.com/surface, visited on May 27, 2014.
OpenCV Software Library. http://opencv.org, visited on May 27, 2014.
Raskar, R., et al. iLamps: geometrically aware and self-configuring projectors. Proc. SIGGRAPH '03, pp. 809-818.
Takatsuka, M., et al. PuckControl: A computer vision-based wireless input device for tabletop display. TR #595, School of Information Technologies, U. of Sydney (2006).
Vicon Motion Systems. http://www.vicon.com, visited on May 27, 2014.
Wachs, J., et al. A gesture-based tool for sterile browsing of radiology images. J. American Medical Informatics Assoc., 15 (3) 321-323 (2008).
Wacom Technology Corporation. http://www.wacom.com, visited on May 27, 2014.
Wilson, A. D. Robust computer vision-based detection of pinching for one and two-handed gesture input. Proc. UIST '06, pp. 255-258.
Wilson, A.D. Using a depth camera as a touch sensor. Proc. ITS '10, pp. 69-72.

* cited by examiner

SYSTEMS AND METHODS FOR ENABLING FINE-GRAINED USER INTERACTIONS FOR PROJECTOR-CAMERA OR DISPLAY-CAMERA SYSTEMS

BACKGROUND OF THE INVENTION

Technical Field

The disclosed embodiments relate in general to systems and methods for enabling user interaction with computing devices and, more specifically, to systems and methods for enabling fine-grained user interaction with projector-camera and/or display-camera systems using a smartphone or other mobile device.

Description of the Related Art

For projection surfaces and display panels in meeting rooms and public areas that lack input capability, it would be useful to enable interaction in a convenient and low-cost way. For coarse-grain interaction hand gesture input technologies have been successfully developed. Examples include systems for game playing, such as Kinect system for Xbox well known to persons of ordinary skill in the art, as well as a system and method described in Wachs, J., Stern, H., Edan, Y., Gillam, M., Handler, J., Feied, C., Smith, M., A gesture-based tool for sterile browsing of radiology images., J. American Medical Informatics Assoc., 15 (3) 321-323 (2008).

U.S. patent application Ser. No. 13/865,990 entitled "SYSTEMS AND METHODS FOR IMPLEMENTING AND USING GESTURE BASED USER INTERFACE WIDGETS WITH CAMERA INPUT" describes a system for detection of gestures for discrete actions with button widgets and gestures for continuous (but not fine-grained) actions for panning and zooming actions with a viewport widget.

As would be appreciated by persons of skill in the art, for fine-grain user interaction such as annotating a slide image or writing on a whiteboard canvas, it can be more advantageous to track a simpler object than the hand or fingers of the user. Because people are accustomed to traditional input devices like the mouse or stylus, it can feel more comfortable to "write" using a device rather than a finger. Input devices also have a standard set of action events (e.g. pen down, pen dragging, and pen up) that are somewhat complicated to implement with finger gestures. Detecting touch is also a hard problem using a typical camera-projection display setup, even with a depth camera, because the camera can only see the back of the finger and the physical finger must be approximated using a geometric model, as described, for example, in Wilson, A. D., Using a depth camera as a touch sensor, Proc. ITS '10, pp. 69-72. Furthermore, fingers are computationally expensive to track and may not scale well for supporting multiple users interacting with a large display surface.

On the other hand, for tracking an object, there exist commercial and research systems, including, without limitation, Vicon Motion Systems, Flock of Birds Tracker, iLamps described in 14. Raskar, R., Baar, J. v., Beardsley, P., Willwacher, T., Rao, S. and Forlines, C. iLamps: geometrically aware and self-configuring projectors. Proc. SIGGRAPH '03, pp. 809-818 as well as Ubiquitous Coded Light described in Raskar, R., Baar, J. v., Beardsley, P., Willwacher, T., Rao, S. and Forlines, C. iLamps: geometrically aware and self-configuring projectors. Proc. SIGGRAPH '03, pp. 809-818. However, these object tracking systems are expensive and/or complex to build, and they require special hardware. Another practical problem that all the above tracking solutions face is that when input devices are put in public meeting rooms or spaces, they can often become misplaced or lost.

Therefore, the conventional systems and methods for enabling user interaction with projection surfaces and display panels are either too imprecise, expensive or lack requisite reliability. Thus, new and improved systems and methods are needed that would enable fine-grained user interaction with projector-camera and/or display-camera systems.

SUMMARY OF THE INVENTION

The embodiments described herein are directed to systems and methods that substantially obviate one or more of the above and other problems associated with the conventional technology for enabling user interaction with projection surfaces and display panels.

In accordance with one aspect of the embodiments described herein, there is provided a computer-implemented method performed in connection with a computerized system incorporating a processing unit, a camera and a memory, the computer-implemented method involving: using the camera to acquire a plurality of images of a mobile computing device held by a user, the mobile computing device displaying a marker pattern; using the central processing unit to detect the marker pattern within the acquired plurality of images; using the central processing unit to determine a plurality of positions of the mobile computing device based on the detected marker pattern within the acquired plurality of images; and processing a user event based on the determined plurality of positions of the mobile computing device.

In one or more embodiments, the computer-implemented method further involves using the central processing unit to determine at least one characteristic of the marker pattern detected within the acquired plurality of images, wherein the processing the user event is further based on the determined at least one characteristic of the marker pattern.

In one or more embodiments, the at least one determined characteristic of the marker pattern is a grid size of the marker pattern.

In one or more embodiments, the at least one determined characteristic of the marker pattern is a color of the marker pattern.

In one or more embodiments, determining the color of the marker pattern involves generating an ordered plurality of interior vertices of the marker pattern; identifying two points in a middle of the ordered plurality of interior vertices; computing locations of two second points in a middle of two adjacent squares of the marker pattern; determining colors at the two second points; and taking one of the determined colors that is not white as the color of the marker pattern.

In one or more embodiments, the processing the user event involves rendering an ink stroke based on the determined plurality of positions of the mobile computing device and wherein the color of the rendered ink stroke is based on the color of the marker pattern.

In one or more embodiments, the at least one characteristic of the marker pattern is a presence or an absence of a predetermined graphical element within the marker pattern.

In one or more embodiments, the predetermined graphical element is a white circular hole.

In one or more embodiments, the presence of the predetermined graphical element within the marker pattern is indicative of a first state and the absence of the predetermined graphical element within the marker pattern is indicative of a second state.

In one or more embodiments, the first state is a pen up state and the second state is a pen down state and the processing the user event comprises rendering an ink stroke based on the determined plurality of positions of the mobile computing device if the pen down state is present.

In one or more embodiments, the at least one determined characteristic of the marker pattern is a rotation angle of the marker pattern.

In one or more embodiments, the processing the user event involves rendering an ink stroke based on the determined plurality of positions of the mobile computing device and the width of the ink stroke is based on the rotation angle of the marker pattern.

In one or more embodiments, the marker pattern is a chessboard marker pattern incorporating a plurality of substantially equally sized squares arranged in a chessboard manner.

In one or more embodiments, the mobile computing device displaying the marker pattern is positioned over content displayed to the user.

In one or more embodiments, the content is displayed to the user using a projector projecting the content onto a projection surface.

In one or more embodiments, the content is displayed to the user using an electronic display device.

In one or more embodiments, the content is displayed to the user using a canvas graphical user interface widget comprising a border.

In one or more embodiments, the computer-implemented method further involves converting the determined plurality of positions of the mobile computing device from coordinates of the plurality of images to coordinates of the canvas graphical user interface widget.

In one or more embodiments, the computer-implemented method further involves performing a calibration operation including changing a color of the border of the canvas graphical user interface widget; detecting a location of the border of the graphical user interface widget in the acquired plurality of images based on the changed color; and generating a mapping between coordinates of the plurality of images and coordinates of the canvas graphical user interface widget.

In one or more embodiments, processing the user event involves rendering an ink stroke in connection with the displayed content based on the determined plurality of positions of the mobile computing device.

In one or more embodiments, the determining the plurality of positions of the mobile computing device involves generating an ordered plurality of interior vertices of the marker pattern for each of the acquired plurality of images.

In one or more embodiments, the determining the plurality of positions of the mobile computing device involves detecting a centroid of the detected marker pattern.

In one or more embodiments, the computer-implemented method further involves setting the determined plurality of positions of the mobile computing device as a motion path of the mobile computing device.

In accordance with another aspect of the embodiments described herein, there is provided a non-transitory computer-readable medium embodying a set of computer-executable instructions, which, when executed in connection with a computerized system incorporating a processing unit, a camera and a memory, causes the computerized system to perform a method involving: using the camera to acquire a plurality of images of a mobile computing device held by a user, the mobile computing device displaying a marker pattern; using the central processing unit to detect the marker pattern within the acquired plurality of images; using the central processing unit to determine a plurality of positions of the mobile computing device based on the detected marker pattern within the acquired plurality of images; and processing a user event based on the determined plurality of positions of the mobile computing device.

In accordance with yet another aspect of the embodiments described herein, there is provided a computerized system incorporating a processing unit, a camera and a memory storing a set of instructions, the set of instructions including instructions for: using the camera to acquire a plurality of images of a mobile computing device held by a user, the mobile computing device displaying a marker pattern; using the central processing unit to detect the marker pattern within the acquired plurality of images; using the central processing unit to determine a plurality of positions of the mobile computing device based on the detected marker pattern within the acquired plurality of images; and processing a user event based on the determined plurality of positions of the mobile computing device.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 10(*b*) illustrates a chessboard marker pattern in a second (e.g. OFF) state.

FIG. 11(*a*) illustrates the use of a nib pen tip for English and certain other European languages.

FIG. 11(*b*) illustrates the use of a brush pen tip for Chinese and other Asian languages.

DETAILED DESCRIPTION

Figure 1:
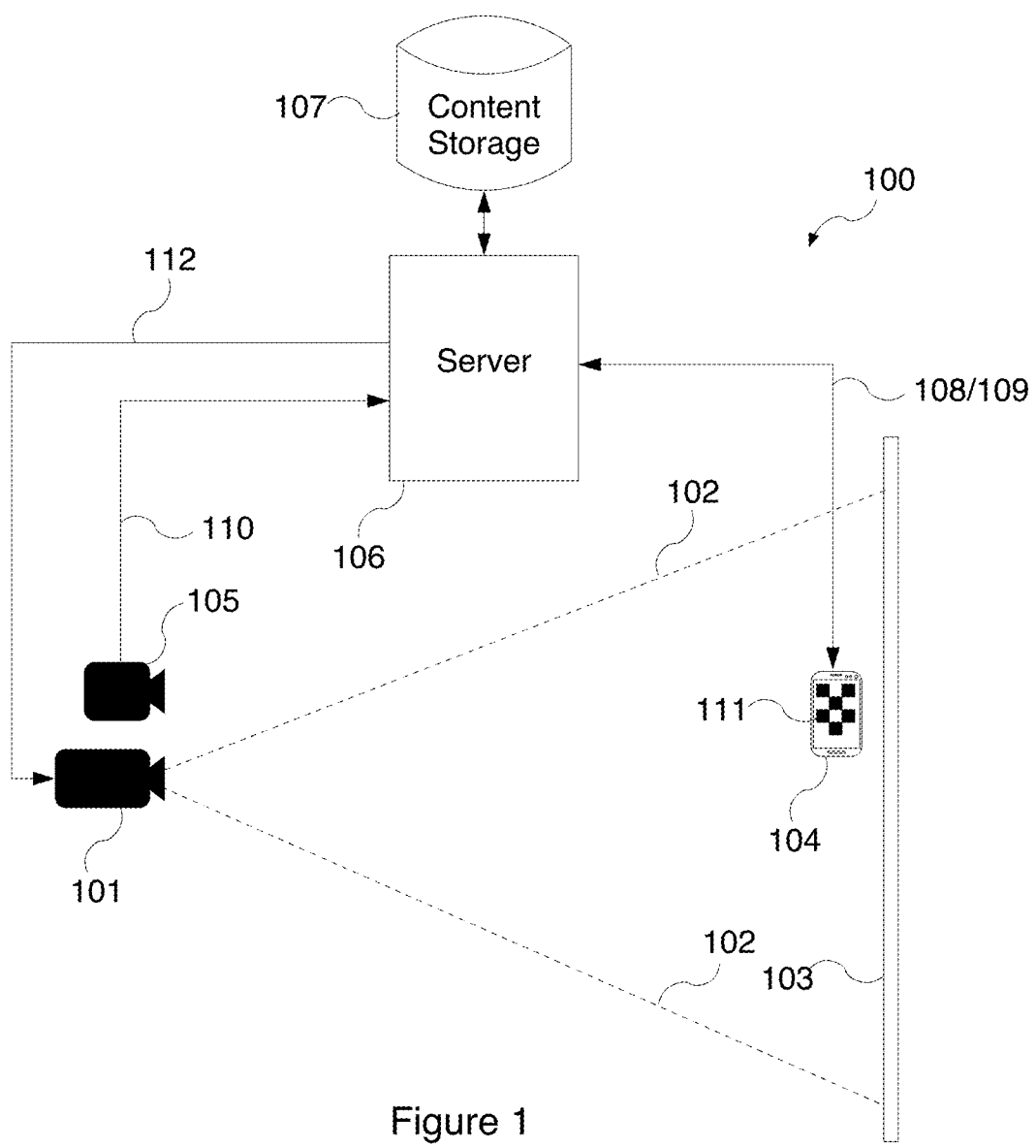
FIG. 1 illustrates an exemplary embodiment of a system for enabling fine-grained interactions for projector-camera systems using a smartphone as an input device.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

In accordance with one aspect of the embodiments described herein, there is provided a system and method for enabling fine-grained interactions for projector-camera or display-camera systems using any smartphone as a mouse or puck input device. Because smartphones are ubiquitous, the use of special hardware is not required and there is no longer the problem of misplacing special devices in public places. In one or more embodiments, to enable the tracking of the smartphone, the system uses the smartphone's display to show chessboard marker patterns. In one embodiment, the aforesaid chessboard marker patterns are displayed using a web browser of the smartphone, which may operate under the control of a web application. In an alternative embodiment, the aforesaid marker patterns are displayed using a native mobile application running on the smartphone.

In one embodiment, a camera located in the conference room or in other public place operating in conjunction with image analysis software executing on a computer platform tracks the location of the chessboard marker patterns displayed on the smartphone. In one or more embodiments, the aforesaid tracking is semi-passive in the sense that the chessboard marker patterns are static but the user can change their properties during interaction. As would be appreciated by persons of skill in the art, this simplifies the system design and deployment. By using the displayed chessboard marker patterns, an embodiment of the described system is able to leverage standard and state-of-the-art image pattern detection algorithms, such as OpenCV or more recently developed algorithms described, for example, in Bennett, S., Lasenby, J. ChESS—Quick and robust detection of chessboard features, Computer Vision and Image Understanding, 118: 197-210 (January 2014). Furthermore, in accordance with one embodiment, there is provided a two-state visual marker based on marker patterns that can be easily detected. In applications such as annotating a slide image or writing on a whiteboard canvas, chessboard marker patterns with different colors and grid sizes are used to indicate different pen width and color (and also to provide user feedback). More advanced control capabilities of an embodiment of the described system will be demonstrated by using it for calligraphy applications.

FIG. 1 illustrates an exemplary embodiment of a system 100 for enabling fine-grained interactions for projector-camera systems using a smartphone as an input device. As would be appreciated by persons of skill in the art, the shown system 100 is flexible and can work with different hardware and software setups. With reference to FIG. 1, the system 100 incorporates, among other elements, a projector 101, a camera 105 as well as a smartphone 104 used as an input device. In one or more embodiments, the projector 101, the camera 105 and the smartphone 104 can be off-the-shelf devices well known to persons of ordinary skill in the art and widely available commercially.

In one or more embodiments, the projector 101 is positioned to project a user interface onto a projection surface 103, such as a projector screen, a desktop or a wall, which is located within the field of view 102 of the projector 101. The projected user interface is then monitored by the camera 105 to detect and track the input device (smartphone) 104, positioned in front of the projection surface 103, for enabling user interaction, see FIG. 1. In one embodiment, the camera 105 is positioned adjacent to the projector 101. In one or more embodiments, a server 106 may be provided to furnish the content 112, including the aforesaid user interface, to the projector 101 for display on the projection surface 103. To this end, the system 100 may incorporate a content storage 107, communicatively coupled with the server 106, for storing the content for subsequent retrieval and display.

In one or more embodiments, the same server 106 or a different server (not shown) may receive the imaging data 110 from the camera 105 and process it to track the location of the input device (smartphone) 104. To enable easy tracking by the camera 105, the input device (smartphone) 104 is configured to display a pattern 111 on its screen, which could be a marker pattern. In one or more embodiments, the chessboard marker pattern 111 is displayed by means of a web browser application executing on the input device (smartphone) 104 and is provided by the same web server 106 using an appropriate uniform resource locator (URL)

via an HTTP protocol well known to persons of ordinary skill in the art. As would be appreciated by persons of ordinary skill in the art, the user needs to hold the smartphone 104 such that the display with the marker pattern is not occluded from the view of the camera 105.

While the below description uses the smartphone as an exemplary input device 104, it should be understood that the inventive concepts described herein are not so limited and any other suitable device having a display screen may be utilized in place of the smartphone to enable user interaction. In addition, the described chessboard marker pattern displayed on the input device 104 is mere one example of a suitable marker pattern that could be used for input device tracking and many other suitable marker patterns may be used in connection with the system 100 shown in FIG. 1 without departing from the scope and spirit of the described invention.

Figure 2:
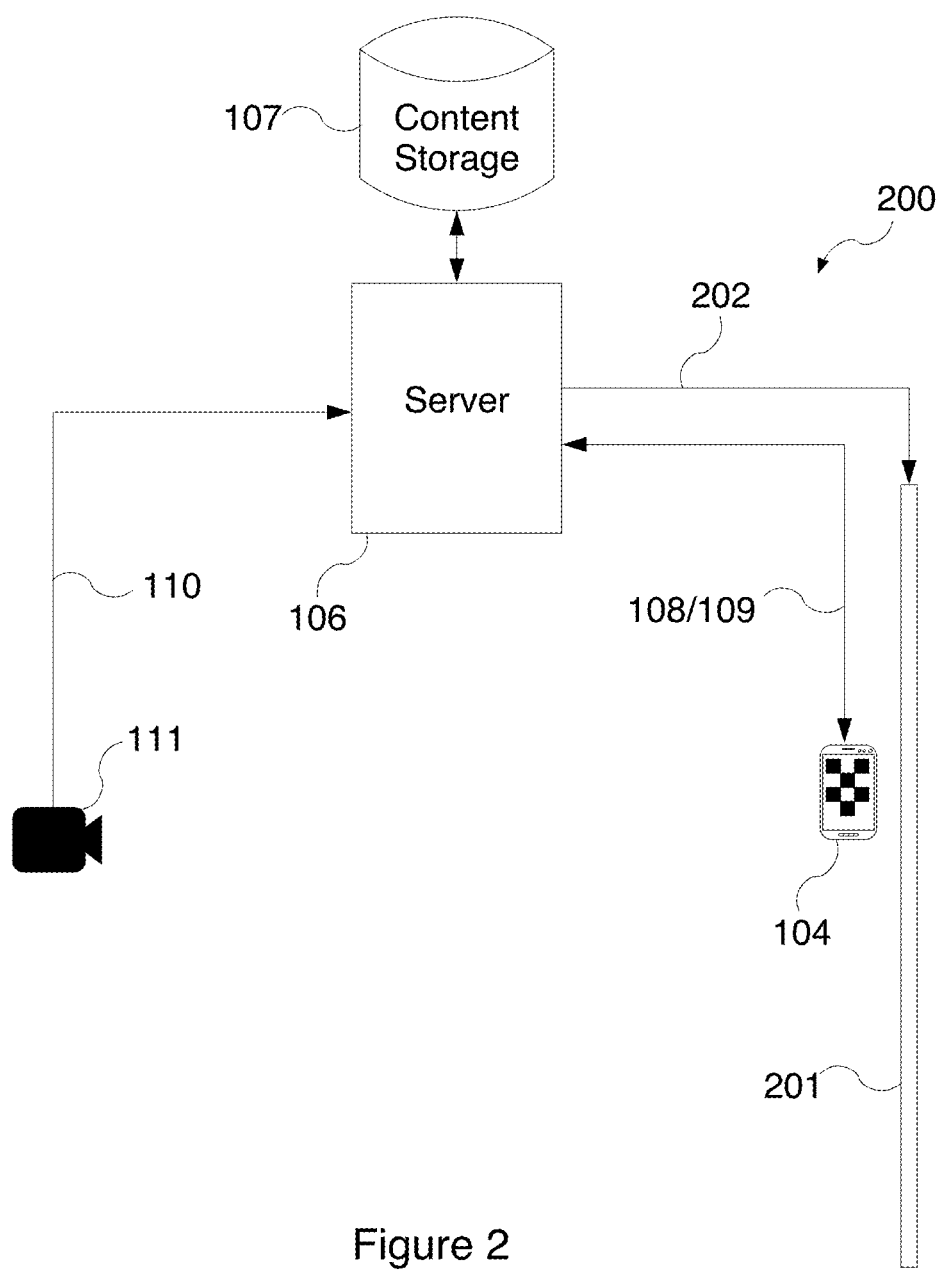
FIG. 2 illustrates an alternative embodiment of a system for enabling fine-grained interactions for display-camera systems using a smartphone as an input device.

FIG. 2 illustrates an alternative embodiment of a system 200 for enabling fine-grained interactions for display-camera systems using a smartphone as an input device. As shown in FIG. 2, the projector 101 and the projection surface 103 has been replaced with a single electronic display 201, communicatively connected with the server 106. In various embodiments, the electronic display 201 is configured to receive the content 202 from the server 106 and to display the user interface containing the retrieved content. In various embodiments, the display 201 may be a liquid crystal display, a plasma display, a CRT display or any other type of visual display well known to persons of ordinary skill in the art. Therefore, the invention is not limited to any specific type of display. The remaining elements of the system 200 shown in FIG. 2 operate in substantially similar manner as the corresponding elements of the system 100 shown in FIG. 1.

Figure 3:
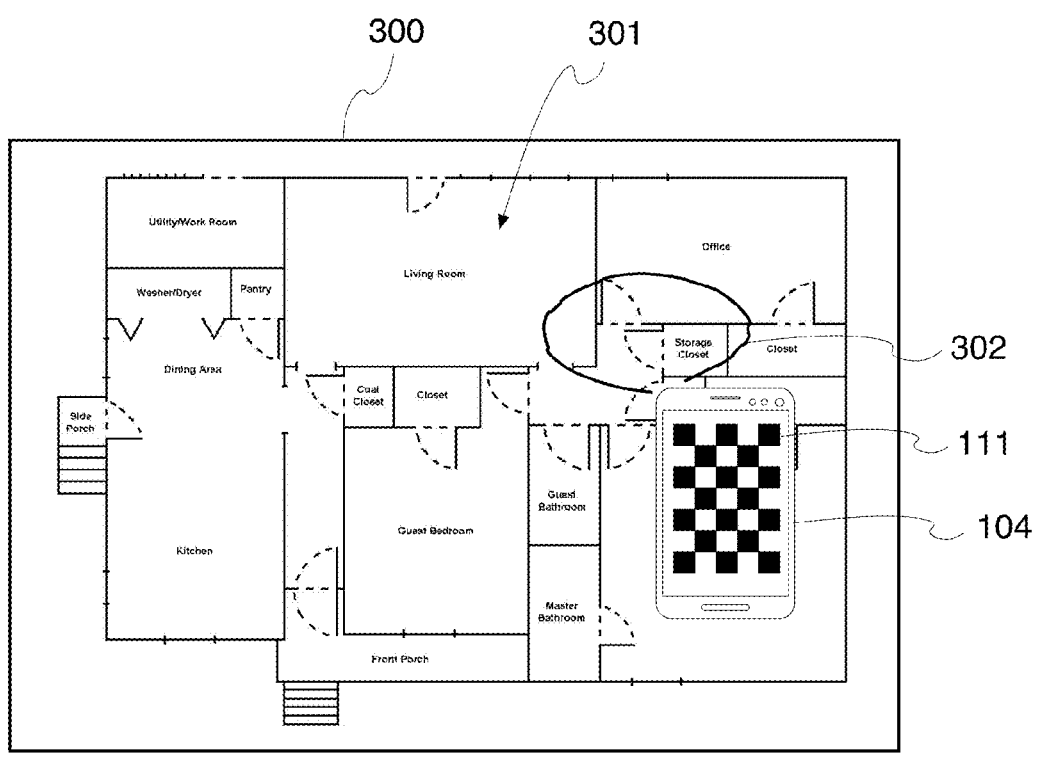
FIG. 3 illustrates an exemplary application of the system shown in FIG. 1 or the system shown in FIG. 2 for adding an annotation to a slide image rendered on a canvas widget displayed to the user using a projector or an electronic display.

In one or more embodiments, the system 100 shown in FIG. 1 or the system 200 shown in FIG. 2 is used for slide image annotation as illustrated in connection with FIG. 3. To this end, a canvas graphical user interface widget 300 shown in FIG. 3 is used to render ink strokes on top of a displayed image 301, such as a slide image (floor plan of a house in FIG. 3). In one or more embodiments, the canvas graphical user interface widget 300 is configured to facilitate automatic calibration to determine its location in the camera view. It should be noted that it is also possible to integrate canvas widgets from other graphical user interface (GUI) toolkits in connection with the described systems 100 and 200, as long as the widgets' locations can be specified automatically or manually.

As shown in FIG. 3, the input device (smartphone) 104 with displayed chessboard marker pattern 111 is used to add an annotation 302 onto the image 301. To this end, the user moves the input device (smartphone) 104 across the image 301 to track the intended annotation. In one or more embodiments, the resulting annotation 302 is offset with respect to the position of the input device (smartphone) 104. In one example, the drawing tool cursor creating the annotation is positioned substantially in the upper left or right corner of the input device (smartphone) 104.

Figure 4:
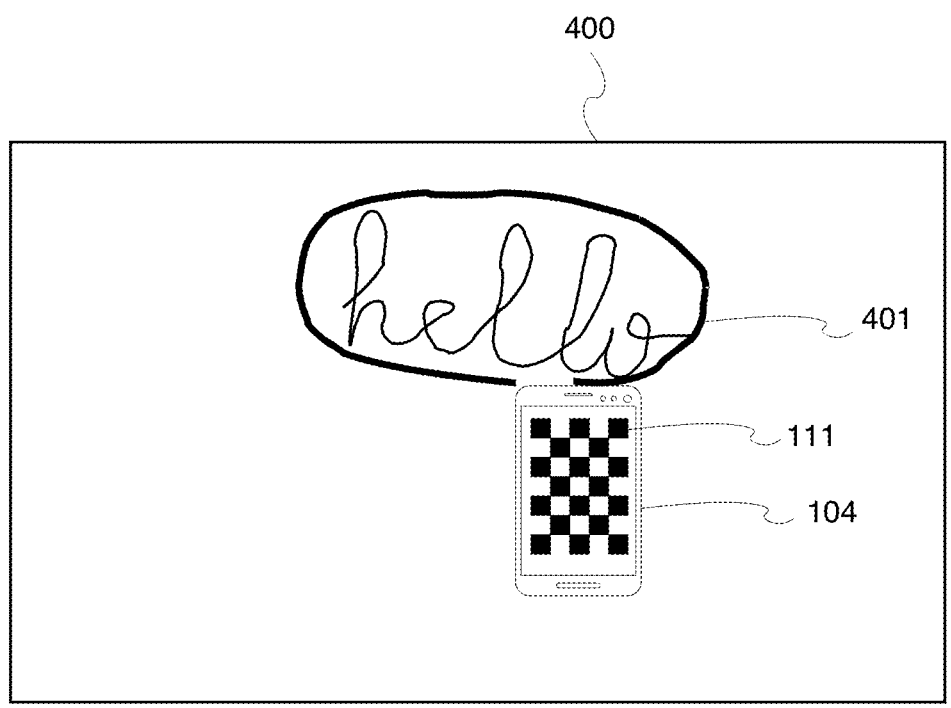
FIG. 4 illustrates an exemplary application of the system shown in FIG. 1 or the system shown in FIG. 2 for adding ink strokes to a whiteboard application built with a canvas widget displayed to the user using a projector or an electronic display.

FIG. 4 illustrates an exemplary application of the system 100 shown in FIG. 1 or the system 200 shown in FIG. 2 for adding an annotation 401 to a whiteboard application built with a canvas widget 400 displayed to the user using the projector 101 or the electronic display 201. As in FIG. 3, the user moves the input device (smartphone) 104 with the displayed chessboard marker pattern 111 across the whiteboard canvas widget 400 to track the intended annotation 401 on the whiteboard canvas widget 400. The camera 105 acquires images or video of the input device (smartphone) 104, which is used for tracking the location of the input device (smartphone) 104. It should be noted that the uses shown in FIGS. 3 and 4 are exemplary only and many other applications of the system 100 shown in FIG. 1 or system 200 shown in FIG. 2 are possible without departing from the scope of the invention. Therefore, the shown examples should not be construed in a limited sense.

As would be appreciated by persons of ordinary skill in the art, there are several ways to run an application on the input device (smartphone) 104 to display the aforesaid chessboard marker patterns for detection by the camera 105. In one embodiment, one or more chessboard marker pattern images are electronically transferred onto the memory of the input device (smartphone) 104 and the default image viewer of the operating system of the input device (smartphone) 104 is utilized to select and display a chessboard marker pattern image on the display device. One drawback to this approach is that navigating among the desired chessboard images can be somewhat awkward for the user.

In another embodiment, the chessboard marker patterns are displayed using a web-based user interface generated by means of a web browser application executing on the input device (smartphone) 104. As would be appreciated by persons of ordinary skill in the art, such web-based user interface works on any type of mobile operating system that has a web browser application, including, without limitation, iOS, Android, Windows Mobile and the like. Finally, in yet another embodiment, the chessboard marker patterns are displayed using a native mobile application executing on the input device (smartphone) 104. As would be appreciated by persons of ordinary skill in the art, this embodiment provides the richest interaction capability for the user, but requires the user to install an application on his smartphone.

FIG. 5(*a*) illustrates an exemplary embodiment of graphical web-based user interface displayed on a display unit of the input device (smartphone) 104 representing a palette of icons for enabling a user to select a pen color and size of the stroke for making annotations as illustrated, for example, in FIGS. 3 and 4. As shown in FIG. 5(*a*), the palette displayed to the user incorporates four palette icons 501, 502, 503 and 504 having different stroke sizes and colors. In the shown embodiment, icons 501 and 503 correspond to large size strokes, while brushes 502 and 504 correspond to small size strokes. Brushes 501 and 502 may be of one color (e.g. red), while brushes 503 and 504 may be of a different color (e.g. black). The user may select the desired stroke size and color for annotation by touching the corresponding palette icon 501, 502, 503 and 504 of the displayed palette.

In one or more embodiments, the graphical user interface shown in FIG. 5(*a*) is implemented as a web page accessed via an HTTP protocol well known to persons of ordinary skill in the art using a web browser executing on the input device (smartphone) 104. In one or more embodiments, the aforesaid web page may be implemented in HTML markup language well known to persons of ordinary skill in the art and hosted by the server 106 shown in FIGS. 1 and 2. To this end, the server 106 may incorporate a web server component. In this implementation, the four icons 501, 502, 503 and 504 are linked, using corresponding uniform resource locators (URLs) to web pages containing the chessboard marker patterns corresponding to the respective brushes.

In one or more embodiments, when the user selects a specific palette icon 501, 502, 503 and 504 from the user interface palette shown in FIG. 5(*a*), the browser executing on the input device (smartphone) 104 follows the corresponding URL to the web page with the corresponding chessboard marker pattern. At this point, the camera 105 detects the presence of the chessboard marker pattern within its field of view and triggers an annotation start event signifying the beginning of the current annotation. Upon the occurrence of this event, a cursor is positioned and displayed on the canvas near the top left corner of the input device (smartphone) 104. In another exemplary embodiment, for left handed users, the cursor can be positioned near the top right corner.

As the user moves the input device (smartphone) 104 across the canvas, the chessboard marker pattern is tracked using the camera 105 and move events are triggered. In one or more embodiments, when the user taps on the displayed chessboard marker pattern, the browser goes back to the palette page shown in FIG. 5(*a*), and the system triggers an annotation end event signifying the completion of the current annotation. The position of the input device (smartphone) 104 detected by the camera 105 is continuously recorded during the annotation and stored on a storage device. In one exemplary embodiment, the aforesaid web-based user interface application is built with the Ruby on Rails framework well known to persons of ordinary skill in the art and static web pages.

In one or more embodiments, for each of the palette icons 501, 502, 503 and 504 shown in FIG. 5(*a*), the corresponding chessboard marker pattern is visually suggestive of the item's properties. For example, the red pen color is represented by a red chessboard marker pattern, and the thin stroke width by a chessboard with a larger grid size that has smaller squares. These visual properties of the chessboard marker patterns are recognized by the system and also provide feedback to the user. For example, FIG. 5(*b*) illustrates a chessboard marker pattern 505 corresponding to thick red stroke represented by icon 501 in FIG. 5(*a*). In the shown embodiment, the chessboard marker pattern 505 consists of large red squares arranged in a chessboard manner. On the other hand, a chessboard marker pattern 506 shown in FIG. 5(*c*) consists of small black squares arranged in a chessboard manner. This marker pattern corresponds to a thin black stroke represented by icon 504 in FIG. 5(*a*).

Figure 6:
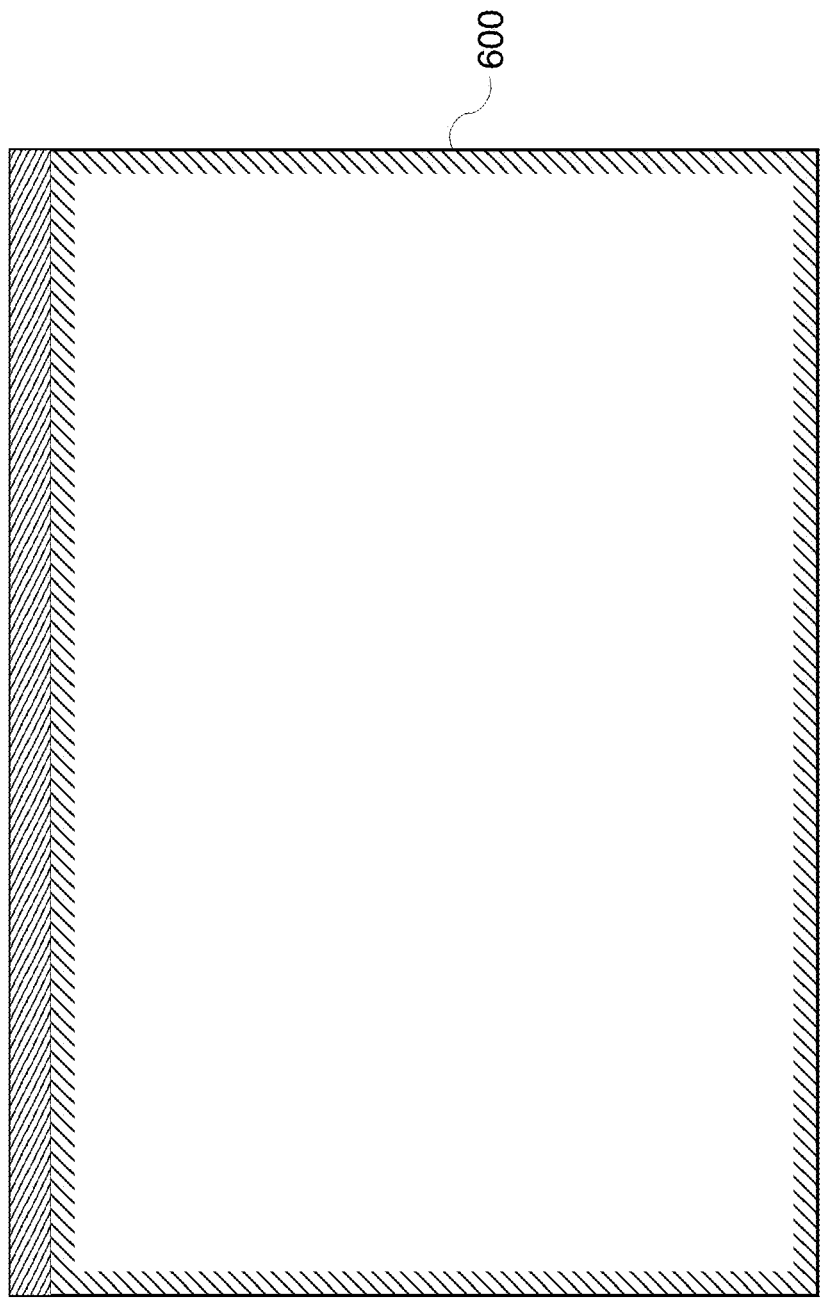
FIG. 6 illustrates an exemplary embodiment of a canvas graphical user interface widget.

FIG. 6 illustrates an exemplary embodiment of a canvas graphical user interface widget 600. In one or more embodiments, the canvas widget 600 is implemented in C++ and works with the Qt application framework well known to persons of ordinary skill in the art. In various embodiments, the canvas graphical user interface widget 600 can display an image for annotation (see image 300 in FIG. 3), or can display a blank background for use as a whiteboard (see FIG. 4).

Figure 7:
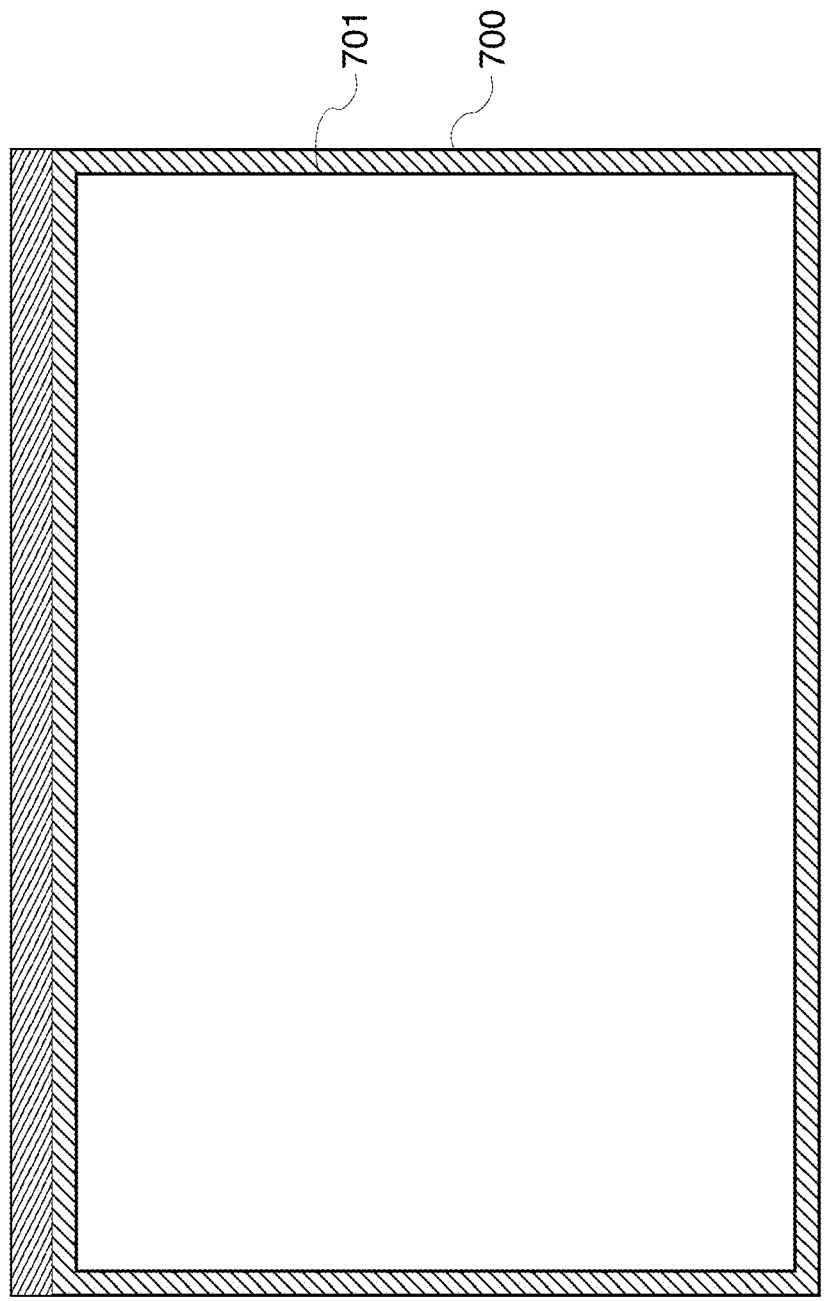
FIG. 7 illustrates an exemplary embodiment of a canvas graphical user interface widget in a calibration mode.

In one or more embodiments, the canvas graphical user interface widget 600 has a calibration mode in which its appearance is changed so that its location can be detected inside the camera view as shown in FIG. 7. Specifically, the color of the border 701 of the canvas graphical user interface widget 700 in the aforesaid calibration mode changes in comparison with the "normal" canvas graphical user interface widget 600. This enables the camera 105 to easily detect the location of the aforesaid border 701. Once the location of the border of the aforesaid border of the canvas graphical user interface widget 600 is determined, a mapping is created between the image (camera) coordinates and the coordinates of the canvas graphical user interface widget 600. As would be appreciated, changing only the canvas widget border color works better than changing the color of the entire canvas widget, because it has less effect on the images captured by the camera 105, when automatic brightness and color adjustments are turned on. In one or more embodiments, the widget calibration can be performed automatically and the calibration data can be saved to a data store for future reuse.

In one or more embodiments, a standard chessboard marker pattern placed within the camera 105 field of view and detected by the camera 105 is used for camera calibration purposes. A robust implementation of the chessboard pattern detection algorithm is available, for example, in the OpenCV computer vision library well known to persons of ordinary skill in the art. Other state-of-the-art chessboard pattern detection algorithms have been developed recently and described in Bennett, S., Lasenby, J. ChESS—Quick and robust detection of chess-board features. Computer Vision and Image Understanding, 118: 197-210 (January 2014).

Figure 8:
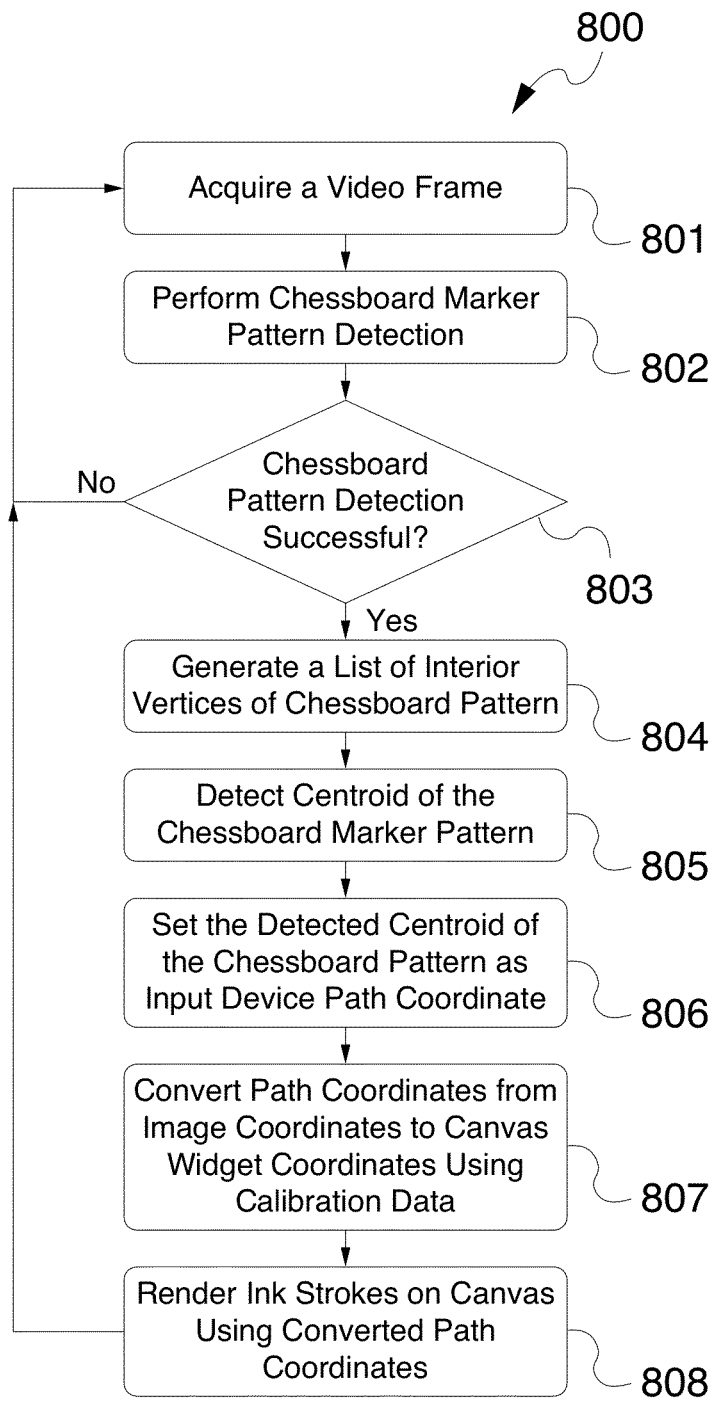
FIG. 8 illustrates an exemplary embodiment of an operating sequence of a system for enabling fine-grained interactions for projector-camera or display-camera systems using a smartphone as an input device.

FIG. 8 illustrates an exemplary embodiment of an operating sequence of a system for enabling fine-grained interactions for projector-camera or display-camera systems using a smartphone as an input device. In general, the operating sequence 800 processes the video frames acquired by the camera 105 and generates action events. For most cameras, the frame rate can go up to 30 fps. A new video frame is acquired or otherwise obtained at step 801. For each acquired video frame, a chessboard detection function, such as the aforesaid OpenCV, is run, see step 802. At step 803, it is determined whether the chessboard marker pattern was successfully detected in the specific acquired video frame. If not, the process acquires a new video frame (step 801) and repeats itself.

If the chessboard marker pattern has been successfully detected in the acquired frame, the system obtains a list of the interior vertices of the detected chessboard marker pattern, see step 804. The centroid is easily computed by looking at one or two points in the middle of the ordered list, see step 805. The detected centroids are used to mark (set) a path for the motion of the input device (smartphone) 104, see step 806. The coordinates of the path are subsequently converted from the camera image coordinates to the canvas widget coordinates based on the widget calibration data, see step 807. After that, the ink strokes are rendered on the canvas based on the detected path and the stroke size and color, see step 808. The process 800 then repeats with acquiring a new video frame at step 801, see FIG. 8.

In one or more embodiments, the aforesaid cursor is offset from the centroid of the chessboard marker pattern displayed on the input device (smartphone) 104 such that the cursor is not occluded by the body of the input device. In the embodiments shown in FIGS. 3 and 4, the cursor is placed in the upper-left corner of the body of the input device (smartphone) 104. In another embodiment, for left handed people, the cursor is placed near the upper-right corner. In yet another embodiment, a portion of the display unit of the input device (smartphone) 104 is used to display dynamically the portion of the canvas occluded by the device, or to display a real-time video acquired by a camera unit of the input device (smartphone) 104. In this manner, the user may be able to see "through" the body of the input device (smartphone) 104.

In one or more embodiments, to detect the grid size of the displayed chessboard marker pattern, the target grid size is used as an input (not output) parameter to the chessboard detection algorithm. Because the set of possible sizes of the displayed chessboard marker patterns is known in advance, the system checks the acquired camera image against these known sizes and determines the matching size. The matching size is then used as the size of the chessboard marker pattern. In one or more embodiments, a similar operation may be performed with respect to the chessboard marker pattern color.

Figure 9:
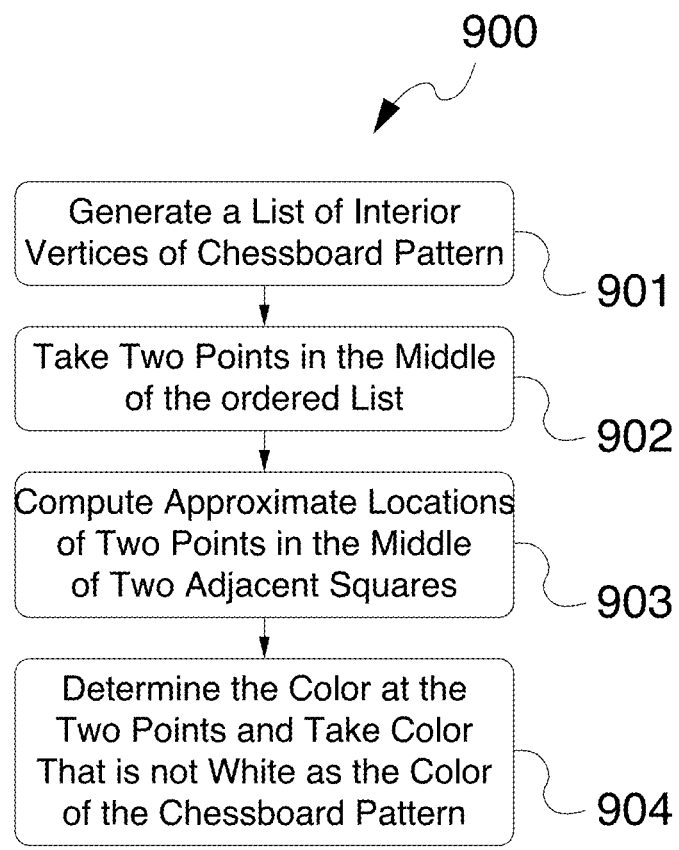
FIG. 9 illustrates an exemplary embodiment of an operating sequence for determining the color of the chessboard marker pattern.

FIG. 9 illustrates an exemplary embodiment of an operating sequence 900 for determining the color of the chessboard marker pattern. In one or more embodiments, in order to detect the color of the chessboard marker pattern, the system first obtains a list of the interior vertices of the detected chessboard marker pattern, see step 901. Subsequently, the system takes two points {P, Q} in the middle of the ordered list of chessboard marker pattern vertices, see step 902. At step 903, the system computes the approximate locations of the two points {C1, C2} at the center of the two adjacent chessboard squares that share the two vertex points {P, Q}. Because C1 and C2 are inside adjacent squares in the chessboard pattern, one of them is not white and its color is the color of the chessboard, as determined in step 904. In one or more embodiments, other chessboard marker pattern properties can be detected or estimated including, without limitation, the pose of the input device (smartphone) 104 or its height above the surface. These determined parameters can also be used to control input properties such as annotation stroke width.

In one or more embodiments, for certain applications it is desirable to have a visual marker based on chessboard patterns with two variations to indicate two states such as ON or OFF. Exemplary ON or OFF states are pen up or pen down states during the annotation process. For example, in the embodiment of the user interface described above in connection with FIGS. 5(a), 5(b) and 5(c), instead of going back to the palette shown in FIG. 5(a) when the user taps on the chessboard marker pattern, a good alternative is to toggle the displayed chessboard marker pattern ON and OFF when the user taps on the chessboard marker. In one embodiment, a swipe gesture is used to go from the displayed chessboard marker (FIG. 5(b) or 5(c)) to the palette of FIG. 5(a). This way, with the pen up and pen down states, the user can continue to work with a selected pen instead of having to reselect the pen again from the palette.

Figure 10A:
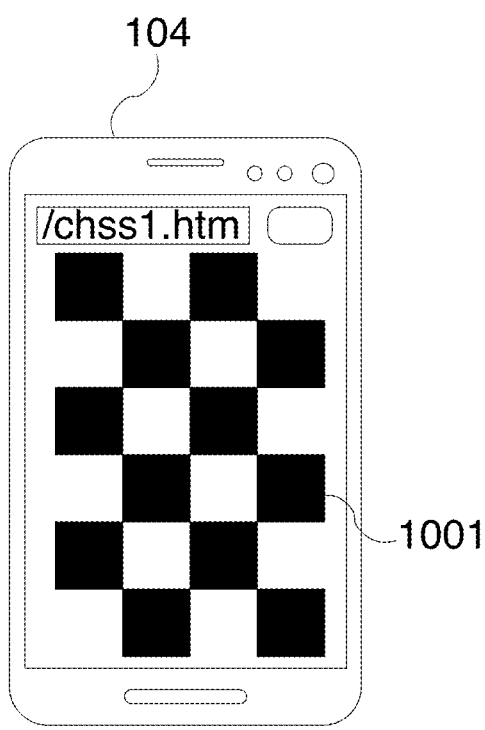
FIG. 10(*a*) illustrates a chessboard marker pattern in a first (e.g. ON) state.
Figure 10B:
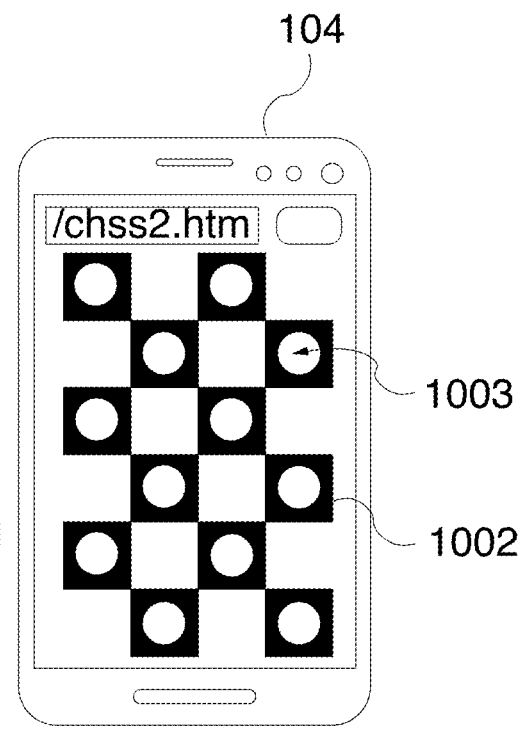

Because the displayed chessboard marker also provides feedback to the user, both ON and OFF patterns of a two-state visual marker should have similar visual appearances and also be visually suggestive of the states. Therefore, in one embodiment, circular holes are placed in the middle of the chessboard marker pattern squares for the OFF state. Such embodiment of the chessboard marker pattern is illustrated in connection with FIGS. 10(a) and 10(b). Specifically, FIG. 10(a) illustrates a chessboard marker pattern in a first (e.g. ON) state. As shown in this figure, the squares 1001 are solidly filled with color. On the other hand, FIG. 10(b) illustrates a chessboard marker pattern in a second (e.g. OFF) state. In this pattern, the squares 1002 have white circular holes 1003 are placed in the middle. As would be appreciated by persons of ordinary skill in the art, the chessboard marker patterns shown in FIGS. 10(a) and 10(b) are exemplary only and many more variations of chessboard marker patterns for different states are possible without departing from the inventive concepts described herein.

It should be noted that the above-described exemplary design of the chessboard marker pattern does not affect the chessboard marker pattern detection because the detection algorithms search for corners of the pattern squares and are not affected by the circles in the middle of these squares. For example, the aforesaid OpenCV detection algorithm was confirmed to be able to detect the chessboard patterns with holes in the middle of the squares. In one or more embodiments, to efficiently determine whether a detected chessboard marker pattern has holes, a procedure is applied that is similar to determining the chessboard color described above: if the adjacent square centers C1 and C2 are both white then the chessboard marker pattern has holes.

In one exemplary embodiment, the described techniques are applied for calligraphy. Calligraphy is a computer-implemented pen drawing feature and can be found in software applications such as Microsoft Paint, Microsoft Fresh Paint, or the open source Inkscape. Typically, the application provides various types of pen tips to mimic the effects of a nib or a brush. Some popular pen digitizers can detect pressure and tilt, and the pressure can be used to control the stroke width of a brush tip.

As would be appreciated by persons of ordinary skill in the art, for real pens made of physical material, the type of pen tip is affected by different factors. With a nib pen tip, the angle of the stroke in relation to the angle of the tip is a main factor in determining the stroke width. With a brush pen tip, the angle of the stroke does not affect the stroke width much. With a brush made of soft bristles, downward pressure on the brush is a main factor in determining the stroke width. On the other hand, with a nib made of stiff material (often metal), pressure has minimal effect the stroke width. The pen tilt can have some effect on the stroke width, but it is more subtle.

When using a pressure sensitive stylus on a tablet display, the mapping of the pressure to the stroke width of a brush does not work very well because it is difficult to vary the range of pressure. For example, with the Microsoft Surface Pro tablet stylus (which employs Wacom technology), well known in the art and available commercially from Microsoft Corporation, the pen tip retracts only a very small amount (less than one millimeter) and the user's feel is quite different from a physical brush with compressible bristles. Specifically, with a physical brush, the fingers can feel more feedback from the greater amount of up and down distance traveled.

Another way to control the stroke width is to use a pair of arrow keys (e.g. left and right) simultaneously while writing with a stylus, which could be non-pressure sensitive. For example, the aforesaid Inkscape application well known to persons of skill in the art supports this method. However, this technique requires using both hands—one for writing with a stylus and the other one for controlling the stroke width using arrow keys, which is quite difficult to coordinate for most users.

In one or more embodiments, for enabling a user to perform calligraphy using the input device (smartphone) 104, several types of pen tips have been created: ballpoint, nib, and brush. The ballpoint tip is the default and produces a simple stroke that has a fixed stroke width, as shown, for example in FIGS. 3 and 4. When using the input device (smartphone) 104 in brush tip mode, the frames acquired by the camera 105 are used to determine the rotation of the input device (smartphone) 104. The determined rotation is used, in turn to control the stroke width. Testing has shown that this can produce better results than using the pressure sensitive stylus on the Surface Pro tablet with the aforesaid Fresh Paint and Inkscape applications, especially for writing characters in Chinese, see FIGS. 11(a) and 11(b).

In one or more embodiments, when using the input device (smartphone) 104 for calligraphy in a nip tip mode, in addition to using the detected rotation of the input device (smartphone) 104 to control the stroke width, the detected angle of the stroke is also used. In one embodiment, the difference of the stroke angle and the device (smartphone) 104 rotation angle is calculated and determines the stroke width. In one extreme, if the stroke angle is parallel to the puck (keeping in mind a physical nib pen tip), the stroke width will be minimal; and in the other extreme, if they are perpendicular, the width will be maximal.

FIGS. 11(a) and 11(b) illustrate an exemplary output of the described calligraphy technique using the input device (smartphone) 104. Specifically, FIG. 11(a) illustrates the use of a nib pen tip for English and certain other European languages, while FIG. 11(b) illustrates the use of a brush pen tip for Chinese and other Asian languages. The strokes have not been smoothed. The shown calligraphy effects are not possible with tablet computers except for very specialized systems that can detect stylus rotation. Thus, using the described system involving the input device (smartphone) 104 can produce better calligraphic effects than using a popular type of stylus on a tablet that can detect pressure. In one embodiment, to improve the appearance of the strokes, automatic enhancements are made to smooth and beautify the strokes.

Figure 12:
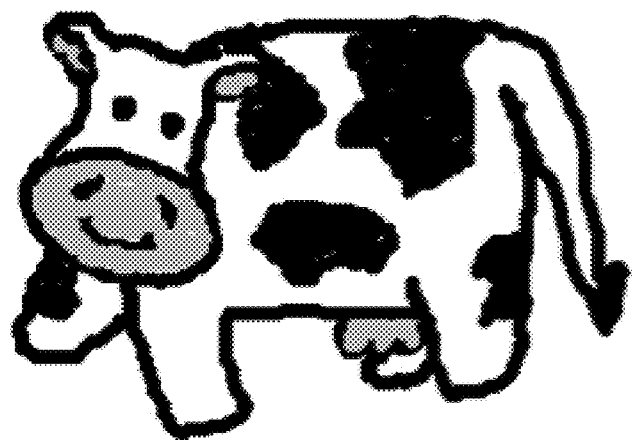
FIG. 12 illustrates an exemplary embodiment of a picture created by using the described system for enabling fine-grained user interactions using a smartphone as an input device for drawing and painting.

As would be appreciated by persons of ordinary skill in the art, drawing and painting can be done with the ballpoint or brush tips. In one or more embodiments, for painting, the described system for enabling fine-grained user interactions using a smartphone as an input device is modified to enable users to add more colors to the palette, as shown, for example, in FIG. 5(a). In another embodiment, the colors pre-set in the palette. An example of a picture created by using the described system including the input device (smartphone) 104 for drawing and painting is shown in FIG. 12.

In one or more embodiments, to mitigate issues with occlusion and lighting, better camera placement and controlling the camera's brightness and white balance are used. In addition, increasing the resolution of the camera 105 permits the size of the chessboard markers to be reduced. In one or more embodiments, the described system for enabling fine-grained user interactions using a smartphone as an input device is configured to support multiple users.

Figure 13:
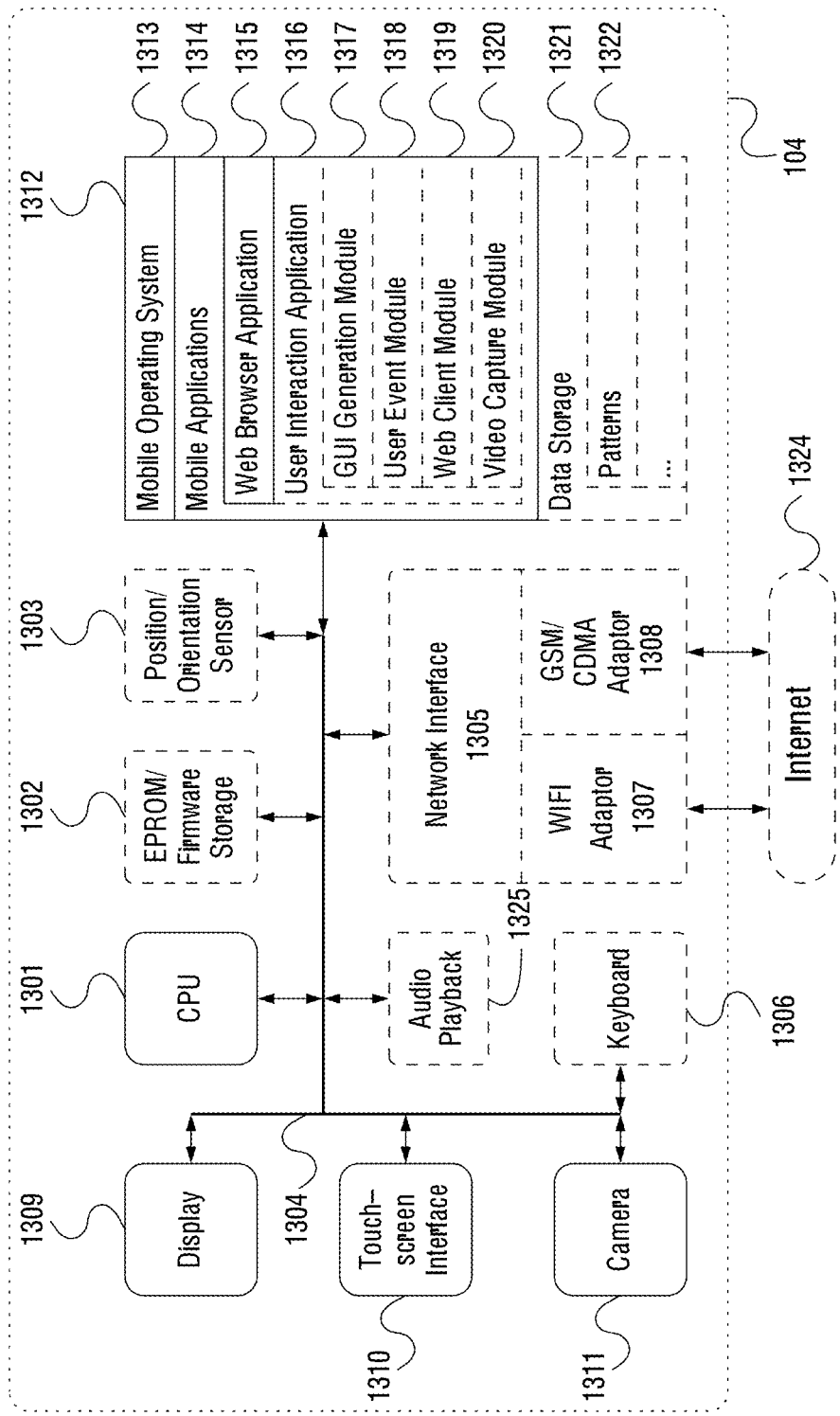
FIG. 13 illustrates an exemplary embodiment of a computerized mobile system that could be used as a user input device in connection with a system for enabling fine-grained user interactions for projector-camera or display-camera systems.

FIG. 13 illustrates an exemplary embodiment of a computerized mobile system that could be used as a user input device 104 in connection with the systems 100 or 200 for enabling fine-grained user interactions shown, respectively, in FIGS. 1 and 2. In one or more embodiments, the computerized mobile system 104 may be implemented within a form factor of a mobile computing device, such as a smartphone, a personal digital assistant (PDA), a tablet computer, or a smart watch, all of which are widely available commercially and are well known to persons of skill in the art.

The computerized system 104 may include a data bus 1304 or other interconnect or communication mechanism for communicating information across and among various hardware components of the computerized system 104, and a central processing unit (CPU or simply processor) 1301 coupled with the data bus 1304 for processing information and performing other computational and control tasks. Computerized system 104 also includes a memory 1312, such as a random access memory (RAM) or other dynamic storage device, coupled to the data bus 1304 for storing various information as well as instructions to be executed by the processor 1301. The memory 1312 may also include persistent storage devices, such as a magnetic disk, optical disk, solid-state flash memory device or other non-volatile solid-state storage devices.

In one or more embodiments, the memory 1312 may also be used for storing temporary variables or other intermediate information during execution of instructions by the processor 1301. Optionally, computerized system 104 may further include a read only memory (ROM or EPROM) 1302 or other static storage device coupled to the data bus 1304 for storing static information and instructions for the processor 1301, such as firmware necessary for the operation of the computerized system 104, basic input-output system (BIOS), as well as various configuration parameters of the computerized system 104.

In one or more embodiments, the computerized system 104 may incorporate a display device 1309, which may be also coupled to the data bus 1304, for displaying various information to a user of the computerized system 104. In an alternative embodiment, the display device 1309 may be associated with a graphics controller and/or graphics processor (not shown). The display device 1309 may be implemented as a liquid crystal display (LCD), manufactured, for example, using a thin-film transistor (TFT) technology or an organic light emitting diode (OLED) technology, both of which are well known to persons of ordinary skill in the art. In various embodiments, the display device 1309 may be incorporated into the same general enclosure with the remaining components of the computerized system 104. In an alternative embodiment, the display device 1309 may be positioned outside of such enclosure.

In one or more embodiments, the computerized system 104 may further incorporate an audio playback device 1325 connected to the data bus 1304 and configured to play various audio files and streams, such as MPEG-3 files, or audio tracks of various video files, such as MPEG-4 files, well known to persons of ordinary skill in the art. To this end, the computerized system 104 may also incorporate waive or sound processor or a similar device (not shown). In the described specific embodiments, the audio playback device 1325 is configured to play to the user the live audio stream of the video conference.

In one or more embodiments, the computerized system 104 may incorporate one or more input devices, such as a touchscreen interface 1310 for receiving tactile commands, a camera 1311 for acquiring still images and video of various objects, as well as a keyboard 1306, which all may be coupled to the aforesaid data bus 1304 for communicating information, including, without limitation, images and video, as well as user command selections to the processor 1301. In an alternative embodiment, input devices may include a system for tracking eye movements of the user (not shown), which may be used to indicate to the computerized system 104 the command selection by the user.

In one or more embodiments, the computerized system 104 may additionally include a positioning and orientation module 1303 configured to supply data on the current geographical position, spatial orientation as well as acceleration of the computerized system 104 to the processor 1301 via the data bus 1304. The geographical position information may be obtained by the positioning module 1303 using, for example, global positioning system (GPS) technology and/or other positioning techniques such as by using information provided by proximate cell towers and/or WIFI hotspots. The acceleration data is supplied by one or more accelerometers incorporated into the positioning and orientation module 1303. Finally, the orientation information may be obtained using acceleration measurements in all 3 axes, including the gravity. In one or more embodiments, the position, orientation and acceleration metadata provided by the positioning and orientation module 1303 is continuously recorded and stored in the data storage unit 1321.

In one or more embodiments, the computerized system 104 may additionally include a communication interface, such as a network interface 1305 coupled to the data bus

1304. The network interface 1305 may be configured to establish a connection between the computerized system 104 and the Internet 1324 using at least one of WIFI interface 1307 and the cellular network (GSM or CDMA) adaptor 1308. The network interface 1305 may be configured to provide a two-way data communication between the computerized system 104 and the Internet 1324. The WIFI interface 1307 may operate in compliance with 802.11a, 802.11b, 802.11g and/or 802.11n protocols as well as Bluetooth protocol well known to persons of ordinary skill in the art. In an exemplary implementation, the WIFI interface 1307 and the cellular network (GSM or CDMA) adaptor 1308 send and receive electrical or electromagnetic signals that carry digital data streams representing various types of information.

In one or more embodiments, the Internet 1324 typically provides data communication through one or more sub-networks to other network resources. Thus, the computerized system 104 is capable of accessing a variety of network resources located anywhere on the Internet 1324, such as remote media servers, web servers, other content servers as well as other network data storage resources. In one or more embodiments, the computerized system 104 is configured send and receive messages, media and other data, including application program code, through a variety of network(s) including Internet 1324 by means of the network interface 1305. In the Internet example, when the computerized system 104 acts as a network client, it may request code or data for an application program executing on the computerized system 104. Similarly, it may send various data or computer code to other network resources.

In one or more embodiments, the computerized system 104 uses the network interface 1305 to send request(s), via the Internet 1324, such as HTTP requests, to the server 106 and receive various information, including the aforesaid chessboard marker patterns, therefrom.

In one or more embodiments, the functionality described herein is implemented by computerized system 104 in response to processor 1301 executing one or more sequences of one or more instructions contained in the memory 1312. Such instructions may be read into the memory 1312 from another computer-readable medium. Execution of the sequences of instructions contained in the memory 1312 causes the processor 1301 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 1301 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 1301 for execution. For example, the instructions may initially be carried on a magnetic disk from a remote computer. Alternatively, a remote computer can load the instructions into its dynamic memory and send the instructions over the Internet 1324. Specifically, the computer instructions may be downloaded into the memory 1312 of the computerized system 104 from the foresaid remote computer via the Internet 1324 using a variety of network data communication protocols well known in the art.

In one or more embodiments, the memory 1312 of the computerized system 104 may store any of the following software programs, applications or modules:

1. Operating system (OS) 1313, which may be a mobile operating system for implementing basic system services and managing various hardware components of the computerized system 104. Exemplary embodiments of the operating system 1313 are well known to persons of skill in the art, and may include any now known or later developed mobile operating systems.

2. Mobile applications 1314 may include, for example, a set of software applications executed by the processor 1301 of the computerized system 104, which cause the computerized mobile system 104 to perform certain predetermined functions, such as display the chessboard marker pattern on the display device 1309. In one or more embodiments, the mobile applications 1314 may include a web browser application 1315 as well as the inventive fine-grained user interaction application 1316 described in detail below.

3. Data storage 1321 may be used, for example, for storing the chessboard marker patterns 1322.

Figure 5C:
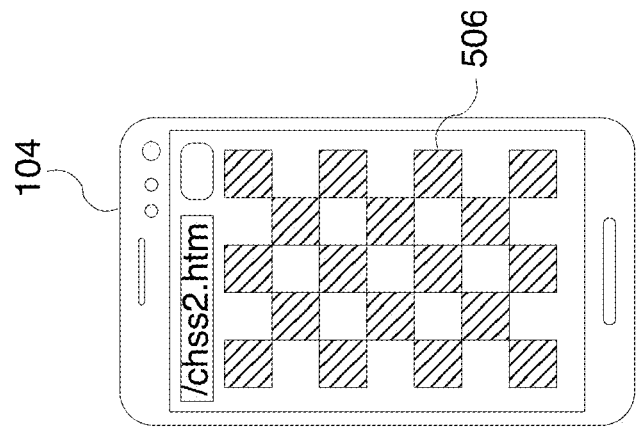
FIG. 5(c) illustrates a chessboard marker pattern corresponding to thin black stroke.
Figure 5B:
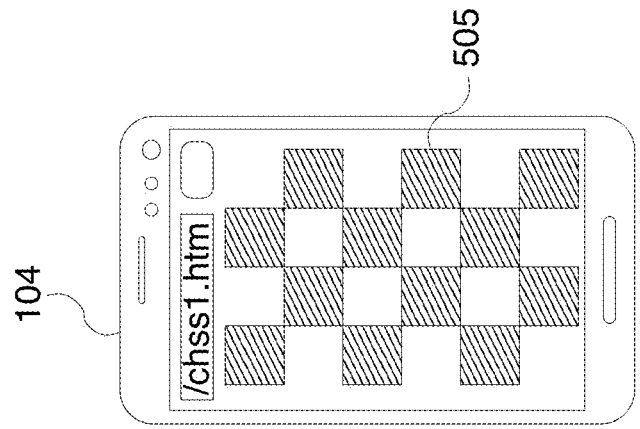
FIG. 5(b) illustrates a chessboard marker pattern corresponding to thick red stroke.
Figure 5A:
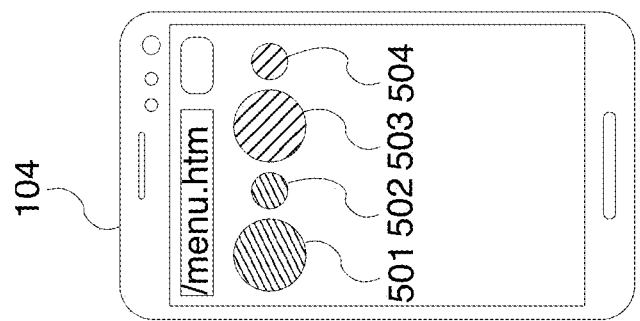
FIG. 5(a) illustrates an exemplary embodiment of graphical web-based user interface displayed on a display unit of the input device (smartphone) representing a palette of icons for enabling a user to select a pen color and size of the stroke for making annotations as illustrated, for example, in FIGS. 3 and 4.

In one or more embodiments, the inventive fine-grained user interaction application 1316 may incorporate a graphical user interface generation module 1317 configured to generate an inventive graphical user interface as shown, for example, in FIGS. 5(a), 5(b) and 5(c). The inventive fine-grained user interaction application 1316 may further incorporate a user event processing module 1318 for processing various types of user events, such as user selections of stroke widths and colors, or moving of the pen, as described in detail above. In addition, there may be provided a web client module 1319 for facilitating the communication between the computerized mobile system 104 and the server 106. Finally, in one or more embodiments, there may be provided a video capture module 1320 for capturing a real-time video using the camera 1311 and displaying the captured real-time video on the display device 1309 to enable the user to "see through" the body of the computerized mobile system 104.

Figure 14:
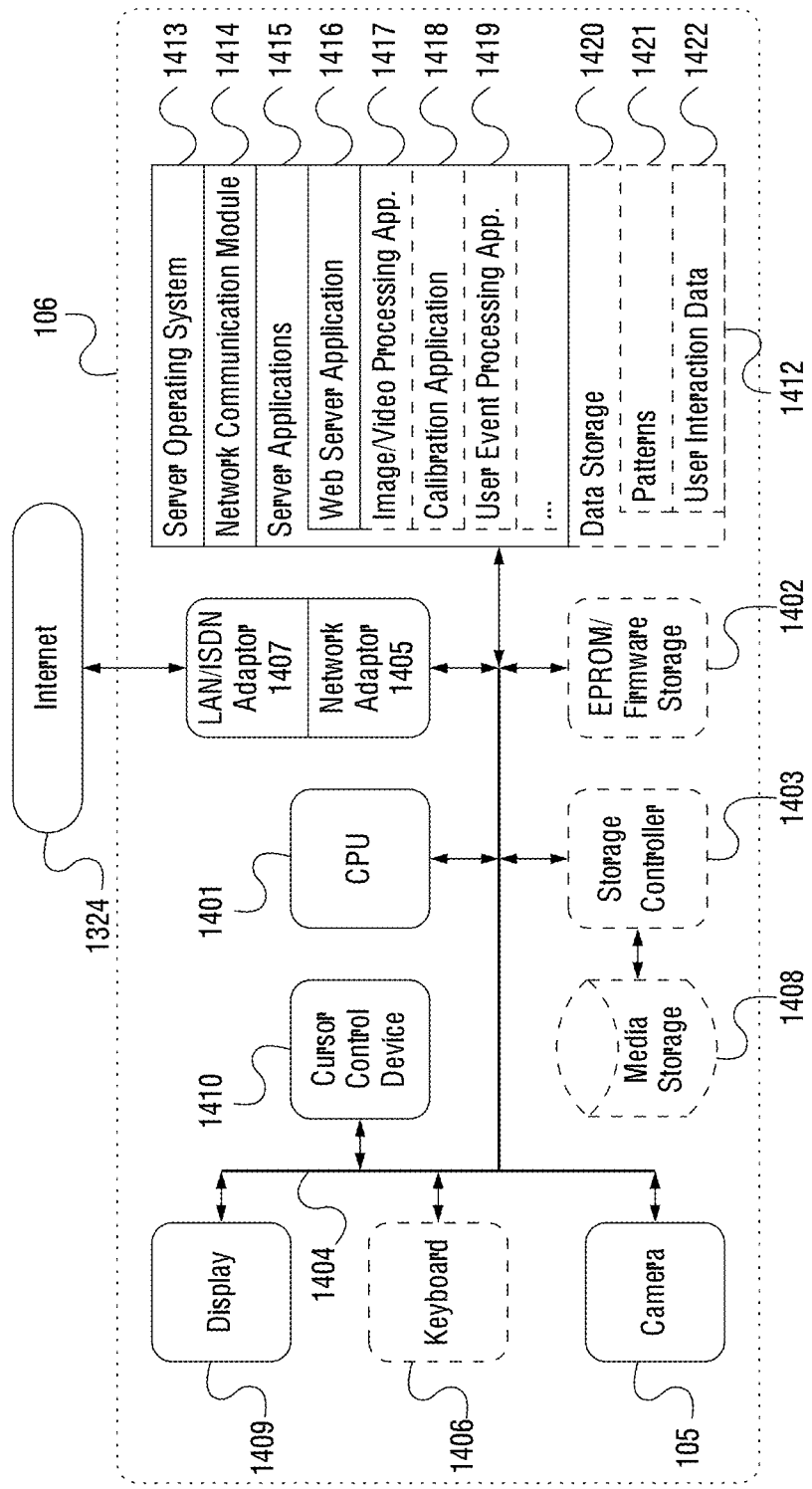
FIG. 14 illustrates an exemplary embodiment of a computerized server system for facilitating the fine-grained user interaction by means of the input device (smartphone) in connection with projector-camera or display camera systems.

FIG. 14 illustrates an exemplary embodiment of a computerized server system 106 for facilitating the fine-grained user interaction by means of the input device (smartphone) 104 in connection with projector-camera or display-camera systems. This server system 106 is also shown in FIGS. 1 and 2 above.

In one or more embodiments, the computerized server system 106 may incorporate a data bus 1404, which may be substantially similar and may perform substantially similar functions as the data bus 1304 of the computerized system 104 illustrated in FIG. 13. In various embodiments, the data bus 1404 may use the same or different interconnect and/or communication protocol as the data bus 1304. The one or more processors (CPUs) 1401, the network adaptor 1405, the EPROM/Firmware storage 1402, the display device 1409 and the keyboard 1406 of the computerized server system 104 may be likewise substantially similar to the respective processor 1301, the network interface 1305, the EPROM/Firmware storage 1302, the display device 1309 and the keyboard 1306 of the computerized system 104, except that the former components are deployed in a server platform configuration. In various implementations, the one or more processor 1401 may have substantially increased processing power as compared with the processor 1301.

In addition to the input device 1406 (keyboard), the computerized server system 106 may additionally include a cursor control device 1410, such as a mouse, a trackball, or cursor direction keys for communicating direction information and command selections to processor 1401 and for controlling cursor movement on the display device 1409. This input device typically has two degrees of freedom in two axes, a first axis (e.g., x) and a second axis (e.g., y), that allows the device to specify positions in a plane.

The LAN/ISDN adaptor 1407 of the computerized server system 106 may be implemented, for example, using an integrated services digital network (ISDN) card or a modem to provide a data communication connection to a corresponding type of telephone line, which is interfaced with the Internet 1324 using Internet service provider's hardware (not shown). As another example, the LAN/ISDN adaptor 1407 may be a local area network interface card (LAN NIC) to provide a data communication connection to a compatible LAN and the Internet 1324. To store various media files, the computerized server system 106 may be provided with a media storage 1408, for storing various content to be displayed to the user for annotation or otherwise, which is connected to the data bus 1404 by means of a storage controller 1403. The camera 105 may be used to acquire images and/or video and detect and track the input device (smartphone) 104 in the manner described above.

In one or more embodiments, the memory 1412 of the computerized server system 106 may store any of the following software programs, applications, modules and/or data:

1. A server operating system (OS) 1413, which may be an operating system for implementing basic system services and managing various hardware components of the computerized server system 106. Exemplary embodiments of the server operating system 1413 are all well known to persons of skill in the art, and may include any now known or later developed operating systems.

2. A network communication module 1414 may incorporate, for example, one or more network protocol stacks which are used to establish a networking connection between the computerized server system 106 and the various network entities of the Internet 1324, such as the computerized mobile system 104, using the network adaptor 1405 working in conjunction with the LAN/ISDN adaptor 1407.

3. Server applications 1415 may include, for example, a set of software applications executed by one or more processors 1401 of the computerized server system 106, which cause the computerized server system 106 to perform certain predetermined functions or tasks. In one or more embodiments, the server applications 1415 may include a web server application 1416 configured to facilitate the generation of the inventive web user interface on the input device (smartphone) 104. In addition, the server applications 1415 may include image/video processing application 1417 configured to implement the image processing and chessboard pattern detection operations described in detail above. Yet additionally, a calibration application 1418 may be provided implementing the calibration operation described above. Finally, the server applications 1415 may further include a user event processing application 1419 for processing various user events, such as selections of stroke sizes and colors.

4. Data storage 1420 may be used, for example, for storing the marker pattern image files 1421 described in detail hereinabove as well as user interaction data 1422, such as the user annotation information described above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for enabling fine-grained interactions for projector-camera or display-camera systems using a smartphone as an input device. It is intended that the specification and examples be considered as exemplary only, with a true scope and spirit of the invention being indicated by the following claims.

What is claimed is:

1. A computer-implemented method performed in connection with a computerized system comprising a processing unit, a camera and a memory, the computer-implemented method comprising:
   a) using the camera to acquire a plurality of images of a mobile computing device held by a user, the mobile computing device displaying a marker pattern;
   b) using the processing unit to detect the marker pattern within the acquired plurality of images;
   c) using the processing unit to determine a plurality of positions of the mobile computing device based on the detected marker pattern within the acquired plurality of images;
   d) using the processing unit to determine at least one characteristic of the marker pattern detected within the acquired plurality of images;
   e) determining presence of a pen up state or a pen down state based on the determined at least one characteristic of the marker pattern; and
   f) processing a user event based on the determined plurality of positions of the mobile computing device, wherein the processing the user event comprises rendering an ink stroke based on the determined plurality of positions of the mobile computing device if the pen down state is present.

2. The computer-implemented method of claim 1, wherein the processing the user event is further based on the determined at least one characteristic of the marker pattern.

3. The computer-implemented method of claim 1, wherein the at least one determined characteristic of the marker pattern is a grid size of the marker pattern.

4. The computer-implemented method of claim 1, wherein the at least one determined characteristic of the marker pattern is a color of the marker pattern.

5. The computer-implemented method of claim 4, wherein determining the color of the marker pattern comprises generating an ordered plurality of interior vertices of the marker pattern; identifying two points in a middle of the ordered plurality of interior vertices; computing locations of two second points in a middle of two adjacent squares of the marker pattern; determining colors at the two second points; and taking one of the determined colors that is not white as the color of the marker pattern.

6. The computer-implemented method of claim 4, wherein the color of the rendered ink stroke is based on the color of the marker pattern.

7. The computer-implemented method of claim 1, wherein the at least one characteristic of the marker pattern is a presence or an absence of a predetermined graphical element within the marker pattern.

8. The computer-implemented method of claim 7, wherein the predetermined graphical element is a white circular hole.

9. The computer-implemented method of claim 7, wherein the presence of the predetermined graphical element within the marker pattern is indicative of a first state and wherein the absence of the predetermined graphical element within the marker pattern is indicative of a second state.

10. The computer-implemented method of claim 9, wherein the first state is the pen up state and wherein the second state is the pen down state.

11. The computer-implemented method of claim 1, wherein the at least one determined characteristic of the marker pattern is a rotation angle of the marker pattern.

12. The computer-implemented method of claim 11, wherein the width of the ink stroke is based on the rotation angle of the marker pattern.

13. The computer-implemented method of claim 1, wherein the marker pattern is a chessboard marker pattern comprising a plurality of substantially equally sized squares arranged in a chessboard manner.

14. The computer-implemented method of claim 1, wherein the mobile computing device displaying the marker pattern is positioned over content displayed to the user.

15. The computer-implemented method of claim 14, wherein the content is displayed to the user using a projector configured to project the content onto a projection surface.

16. The computer-implemented method of claim 14, wherein the content is displayed to the user using an electronic display device.

17. The computer-implemented method of claim 14, wherein the content is displayed to the user using a canvas graphical user interface widget comprising a border.

18. The computer-implemented method of claim 17, further comprising converting the determined plurality of positions of the mobile computing device from coordinates of the plurality of images to coordinates of the canvas graphical user interface widget.

19. The computer-implemented method of claim 17, further comprising performing a calibration operation comprising changing a color of the border of the canvas graphical user interface widget; detecting a location of the border of the graphical user interface widget in the acquired plurality of images based on the changed color; and generating a mapping between coordinates of the plurality of images and coordinates of the canvas graphical user interface widget.

20. The computer-implemented method of claim 14, wherein processing the user event comprises rendering an ink stroke in connection with the displayed content based on the determined plurality of positions of the mobile computing device.

21. The computer-implemented method of claim 1, wherein the determining the plurality of positions of the mobile computing device comprises generating an ordered plurality of interior vertices of the marker pattern for each of the acquired plurality of images.

22. The computer-implemented method of claim 1, wherein the determining the plurality of positions of the mobile computing device comprises detecting a centroid of the detected marker pattern.

23. The computer-implemented method of claim 1, further comprising setting the determined plurality of positions of the mobile computing device as a motion path of the mobile computing device.

24. A non-transitory computer-readable medium embodying a set of computer-executable instructions, which, when executed in connection with a computerized system comprising a processing unit, a camera and a memory, cause the computerized system to perform a method comprising:
 a) using the camera to acquire a plurality of images of a mobile computing device held by a user, the mobile computing device displaying a marker pattern;
 b) using the processing unit to detect the marker pattern within the acquired plurality of images;
 c) using the processing unit to determine a plurality of positions of the mobile computing device based on the detected marker pattern within the acquired plurality of images;
 d) using the processing unit to determine at least one characteristic of the marker pattern detected within the acquired plurality of images;
 e) determining presence of a pen up state or a pen down state based on the determined at least one characteristic of the marker pattern; and
 f) processing a user event based on the determined plurality of positions of the mobile computing device, wherein the processing the user event comprises rendering an ink stroke based on the determined plurality of positions of the mobile computing device if the pen down state is present.

25. A computerized system comprising a processing unit, a camera and a memory storing a set of instructions, the set of instructions comprising instructions for:
 a) using the camera to acquire a plurality of images of a mobile computing device held by a user, the mobile computing device displaying a marker pattern;
 b) using the processing unit to detect the marker pattern within the acquired plurality of images;
 c) using the processing unit to determine a plurality of positions of the mobile computing device based on the detected marker pattern within the acquired plurality of images;
 d) using the processing unit to determine at least one characteristic of the marker pattern detected within the acquired plurality of images;
 e) determining presence of a pen up state or a pen down state based on the determined at least one characteristic of the marker pattern; and
 f) processing a user event based on the determined plurality of positions of the mobile computing device, wherein the mobile computing device displaying the marker pattern is positioned over content displayed to the user and wherein processing the user event comprises rendering an ink stroke based on the determined plurality of positions of the mobile computing device if the pen down state is present.

* * * * *